Sept. 8, 1936.    J. G. RITTER    2,053,444
STATOR FRAME AND METHOD OF MAKING SAME
Filed Feb. 14, 1934
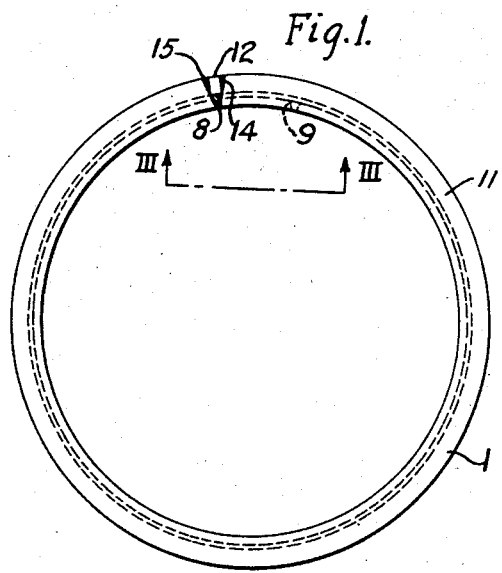
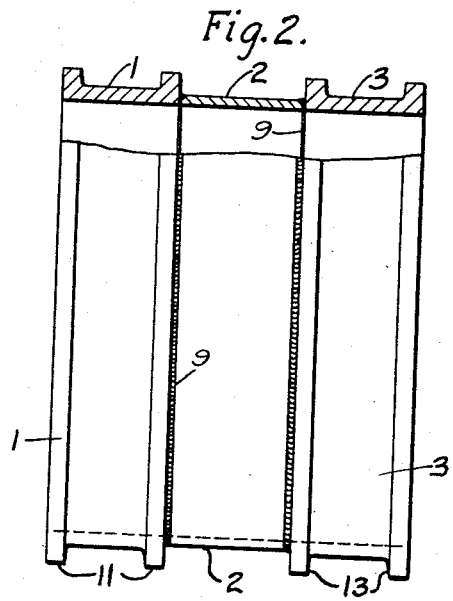
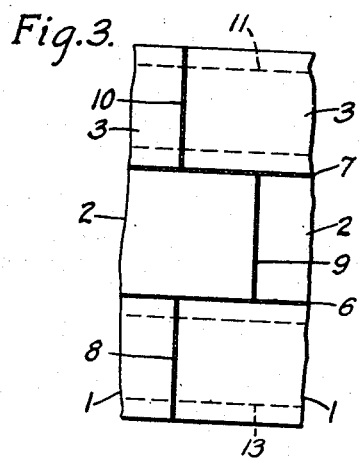
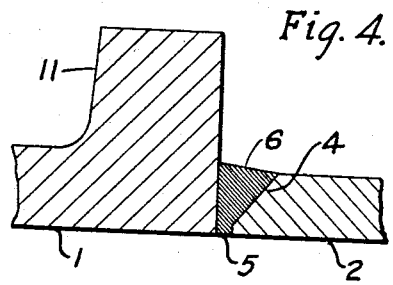
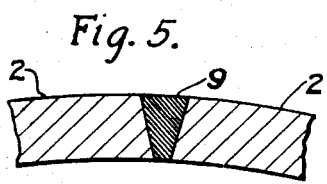
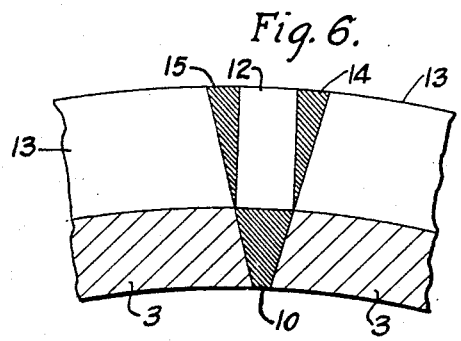
WITNESSES:
INVENTOR
John G. Ritter.
BY
ATTORNEY Patented Sept. 8, 1936

2,053,444

UNITED STATES PATENT OFFICE 2,053,444

STATOR FRAME AND METHOD OF MAKING SAME

John G. Ritter, Irwin, Pa., assignor to Westinghouse Electric & Manufacturing Company, East Pittsburgh, Pa., a corporation of Pennsylvania Application February 14, 1934, Serial No. 711,133

15 Claims. (Cl. 29—148.2)

This invention relates to frames for machines, particularly frames for electric motors and generators and method of making same.

One object of the invention is to provide a frame that will be strong and durable and inexpensively made without the formation of complicated and costly steel castings hitherto used.

Another object of this invention is to construct the main portions of the frame of a dynamo electric machine out of a minimum number of parts thereby simplifying and cheapening the structure and also improving its magnetic characteristics.

As has been the custom heretofore, frames for electric motors or generators were made out of costly steel castings having, as a rule, complicated shapes and not the best magnetic characteristics desirable for electric machinery. The problem thus presented itself of constructing a framework out of metal plate stock, which is known to have better magnetic characteristics than cast material and is also known to have much better mechanical strength for a given weight than cast material.

One object of this invention is to provide a strong, simple and durable frame structure, and process of making the same, consisting of a minimum number of parts and a minimum number of connecting joints.

Other objects and advantages will become more apparent from a study of the following specification when read in conjunction with the drawing, in which:

Figure 1 is an end view of the frame structure of a dynamo electric machine;

Fig. 2 is a side view, with parts in section, of the frame of a dynamo electric machine;

Fig. 3 is a detailed view of the frame structure of a portion illustrated by the section line I—I in Fig. 1, and Figs. 4, 5, and 6 are detail views of the joints connecting the main portions of the frame structure to themselves and to each other.

As will be apparent from an inspection of Fig. 1, the frame or stator member of a motor embodying my invention is a very simple structure consisting of a single composite cylindrical member consisting, as is shown in Fig. 3, of three main portions, 1, 2, and 3. The central portion 2 is merely a strip of boiler plate formed into a substantially cylindrical shape and having its abutting ends welded by a single joint such as is indicated at 9 in Fig. 3.

The main portions 1 and 3 of the frame are heavier stock-steel structures, which are substantially the shape of one half of a split I-beam in section, and which, in the manufacturing process, are formed into substantially cylindrical members of the size and shape of the central portion 2 and welded together by joints such as indicated at 8 and 10 in Fig. 3. The main portions 1 and 3 are thus provided with the reenforcing ribs 11 and 13, thus lending rigidity to the frame structure and also increasing the section to thus decrease the flux density in the material of the frame when the motor is in operation.

The boiler-plate strip or portion 2 is chamfered along its side or circumferential edges, in the manner indicated at 4 and 5 in Fig. 4, so as to increase the area for depositing the welding material by electric welding, as well as to simplify the welding operation. As shown in Fig. 2, both circumferential edges of the center frame-portion 2 are shaped alike and form but two welded joints 6 and 7 with the main frame-portions 1 and 3.

If the central portion 2 be considered, a straight strip of boiler plate is cut to the required size, and then formed into a cylindrical member as indicated in Figs. 1 and 2, and the ends will abut somewhat as shown in Fig. 5, thus providing an effective V-shaped groove for depositing the welding material 9 by means of electric welding.

The end weld of the main portions 1 and 3 is not quite as simple as that shown for the one in Fig. 5, because of the reenforcing ribs 11 and 13 constituting an integral part of the main portions 1 and 3, respectively. To expedite the welding process at the reenforcing ribs and to otherwise improve the joint, steel blocks 12, such as are indicated in Fig. 6, are placed in position, after the joint 10 or 8 as the case may be, has been completed and then the remaining portions of the joint, namely 14 and 15, are completed at the reenforcing ribs.

The more desirable arrangement of the various welded joints is as shown in Fig. 3, namely, with the joints 8, 9, and 10 not in aligned relation but in staggered relation. In fact, the joints 8 and 10 need not be in the same plane as is shown in Fig. 3. The important thing about the arrangement of the joints 8, 9, and 10 is that they shall not be all at substantially the same point on the circumference or perimeter of the composite frame structure.

In many applications such precautions in the process of manufacture, to assure additional strength, need not be taken, in which case the joints 8, 9, and 10 may all be aligned to constitute a single joint. The composite frame structure will thus have a minimum number of individual welded joints, namely, only three where three main portions are used or, as may sometimes happen, the joints 8 and 9 may be aligned whereas the joint 10 is not aligned, thus uniting the main portions to themselves and to each other by four individual welded joints. If the arrangement is as shown in Fig. 3, the maximum number of joints for the arrangement disclosed herein is five individual welded joints.

From the foregoing disclosure, it is obvious that my frame structure is very much simpler, and is at the same time more rugged, than any that has been used heretofore. The metal frame is built up of metal plate stock which may be cold-rolled steel having mechanical and electrical properties superior to the much more expensive steel castings. Further, my frame structure may also be much more readily installed in places where the difficulty of casting or transporting the cast steel frame would be prohibitive.

I am aware, of course, that others, after having had the benefit of the teachings of this invention, may devise frame structures using cold-rolled steel strips. However, I wish it to be understood that I am not to be limited to the specific structure hereinbefore described or shown in the drawing but that my invention is to be limited only by the pertinent prior art and the scope of the appended claims.

I claim as my invention:

1. A frame for the stator of a dynamo-electric machine constructed of rolled plate-metal strips all having substantially the same length, comprising a number of strips, said strips being formed into substantially cylindrical shape and welded into a composite cylindrical frame having welded joints ranging, in number, from a minimum of $n$ individual welded joints to no more than $2n-1$ individual welded joints, where $n$ is any integer greater than 2 and designates the number of strips.

2. A frame for a dynamo-electric machine, constructed of rolled plate-metal strips all having substantially the same length, comprising $n$ strips, said strips being formed into substantially cylindrical shape and welded together to form a composite cylindrical frame having welded joints ranging, in number, from a minimum of $n+1$ individual welded joints to no more than $2n-1$ individual welded joints, where $n$ is any integer greater than unity.

3. A frame for a dynamo-electric machine, constructed of rolled plate-metal strips all having substantially the same length, comprising $n$ strips, said strips being formed into substantially cylindrical shape and welded together to form a composite cylindrical frame having welded joints ranging, in number, from a minimum of $n+2$ individual welded joints to no more than $2n-1$ individual welded joints, where $n$ is any integer greater than 2.

4. A stator frame for a dynamo-electric machine, comprising two separate end-members of relatively heavy ribbed construction, and at least one intermediate member of lighter construction, all of said members being of substantially cylindrical shape and having approximately identical bore-diameters, and a plurality of circumferential lines of welding joining all of said members together.

5. A stator frame for a dynamo-electric machine, comprising two separate end-members of relatively heavy ribbed construction, and at least one intermediate member of lighter construction, all of said members being of substantially cylindrical shape and having approximately identical bore-diameters, and a plurality of circumferential lines of welding joining all of said members together, each of said end-members comprising a circularly bent, flanged-section bar-stock, having its abutting ends welded together.

6. A stator frame for a dynamo-electric machine, comprising two separate end-members of relatively heavy ribbed construction, and at least one intermediate member of lighter construction, all of said members being of substantially cylindrical shape and having approximately identical bore-diameters, and a plurality of circumferential lines of welding joining all of said members together, each of said end-members comprising a circularly bent, flanged-section bar-stock, having its abutting ends welded together, characterized by a separate filler-block inserted in the flanged portion of each end-member in its abutting-end weld.

7. A frame of heavy ribbed construction comprising a circularly bent, flanged-section bar-stock, having its abutting ends welded together, characterized by a separate filler-block inserted in the flanged portion of said frame in its abutting-end weld.

8. The method of fabricating a frame of heavy ribbed construction, comprising bending a flat flanged-section bar into substantially circular shape so as to provide a cylindrical frame with a cylindrical web-member and one or more outwardly extending ribs or flanges, welding the abutting ends of said bar by depositing metal substantially to the depth of said web-member, inserting a separate metal filler-block between the abutting ends of a rib or flange, and continuing the welding of said rib or flange by depositing more metal alongside of said filler-block.

9. A stator for a dynamo-electric machine constructed of three rolled plate-metal strips all having substantially the same length and comprising, two relatively heavy flanged strips, a comparatively thin plain strip, all of said strips being welded together at their ends to form substantially cylindrical structures, said structures being aligned so that the plain member is disposed intermediate the flanged members and welded into a composite cylindrical frame having welded joints ranging, in number, from a minimum of three individual welded joints to no more than five individual welded joints.

10. A stator for a dynamo-electric machine constructed of three rolled plate-metal strips all having substantially the same length and comprising, two relatively heavy flanged strips, a comparatively thin plain strip, all of said strips being welded together at their ends to form substantially cylindrical structures, said structures being aligned so that the plain member is disposed intermediate the flanged members and welded into a composite cylindrical frame having welded joints ranging, in number, from a minimum of four individual welded joints to no more than five individual welded joints.

11. A stator for a dynamo-electric machine constructed of three rolled plate-metal strips all having substantially the same length and comprising, two relatively heavy flanged strips, a comparatively thin plain strip, all of said strips being welded together at their ends to form substantially cylindrical structures, said structures being aligned so that the plain member is disposed intermediate the flanged members and welded into a composite cylindrical frame having no more than five individual welded joints.

12. A stator for a dynamo-electric machine constructed of rolled plate-metal strips all having substantially the same length and comprising, a plurality of flanged relatively heavy strips, a plurality of comparatively thin plain strips one less in number than said first named strips, all of said strips being welded together to form substantially cylindrical structures all said structures being alternately aligned and welded into a composite cylindrical frame having welded joints ranging, in number, from a minimum of $n$ individual welded joints to no more than $2n-1$ individual welded joints, where $n$ is any integer greater than 2 and designates the total number of strips.

13. A stator frame for a dynamo-electric machine, comprising two separate end-members of relatively thick material and having a sectional contour of a split I-beam, an intermediate member of lighter construction, all of said members being of substantially cylindrical shape and the ribs of the split I-beam section being disposed remote from the axis of the cylindrical shape and having approximately equal bore-diameters, and two circumferential lines of welding joining all of said members together.

14. The method of fabricating a machine frame, comprising bending two flat bars, having reinforcing ribs at the edges, into substantially circular shape of like dimensions so as to provide a pair of cylindrical frames each having a cylindrical web-member and a pair of outwardly extending ribs, bending a flat bar member into substantially circular shape so as to provide a cylindrical member of substantially the same dimensions as said cylindrical frames formed by said ribbed bars, welding the abutting ends of said bars and member, respectively, welding one circumferential edge of one of the frames to one circumferential edge of the member, and welding one circumferential edge of the other frame to the other circumferential edge of the member.

15. The method of fabricating a machine frame, comprising bending two flat bars, having reinforcing ribs at the edges, into substantially circular shape of like dimensions so as to provide a pair of cylindrical frames each having a cylindrical web-member and a pair of outwardly extending ribs, bending a flat bar member into substantially circular shape so as to provide a cylindrical member of substantially the same dimensions as said cylindrical frames formed by said ribbed bars, welding the abutting ends of said bars and member, respectively, welding one circumferential edge of one of the frames to one circumferential edge of the member in such manner that the weld at the abutting ends of the member and the abutting ends of the bar frame are not in line, and similarly welding the other frame to the other circumferential edge of the member.

JOHN G. RITTER.